US011586697B2

(12) United States Patent
Yan et al.

(10) Patent No.: US 11,586,697 B2
(45) Date of Patent: Feb. 21, 2023

(54) PUBLISHING REST API CHANGES BASED ON SUBSCRIBER'S CUSTOMIZED REQUEST

(71) Applicant: VMware, Inc., Palo Alto, CA (US)

(72) Inventors: Shuying Yan, Beijing (CN); Qiang Wan, Beijing (CN); Changhui Tan, Beijing (CN); Ming Liu, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 77 days.

(21) Appl. No.: 16/283,835

(22) Filed: Feb. 25, 2019

(65) Prior Publication Data
US 2020/0226185 A1 Jul. 16, 2020

(51) Int. Cl.
*G06F 15/16* (2006.01)
*G06F 16/958* (2019.01)
*G06F 9/54* (2006.01)
*H04L 67/00* (2022.01)

(52) U.S. Cl.
CPC ............ *G06F 16/958* (2019.01); *G06F 9/542* (2013.01); *H04L 67/34* (2013.01)

(58) Field of Classification Search
CPC ................. G06F 16/958; H04L 67/34
See application file for complete search history.

(56) References Cited

U.S. PATENT DOCUMENTS

2016/0226946 A1* 8/2016 Karaatanassov ........ H04L 67/02
2018/0089005 A1* 3/2018 Green ..................... G06F 9/547
2019/0325074 A1* 10/2019 Ghezzi ..................... G06F 8/36

OTHER PUBLICATIONS

IBMm, "WebSphere Application Server Liberty Version 8 Release 5", May 7, 2018, all pages, http://ftpmirror.your.org/pub/misc/ftp.software.ibm.com/software/webserver/appserv/library/liberty/Liberty_ND_all_platforms_8559.pdf (Year: 2018).*

* cited by examiner

*Primary Examiner* — Hua Fan
(74) *Attorney, Agent, or Firm* — Su IP Consulting

(57) ABSTRACT

System and methods for automatically publishing Representational State Transfer (REST) Application Programming Interface (API) changes in a cloud environment are described. A publish/subscribe server (PSS) may receive from a subscriber a customized request for monitoring a registered REST API supported by a REST service provider (RSP) and registered with the PSS. The subscriber is configured to invoke the registered REST API at the RSP. The PSS may monitor the registered REST API for any changes at the RSP based on the customized request. In response to a determination that the registered REST API is changed at the RSP, the PSS may generate a REST API change report indicating a change event occurred to the registered REST API at the RSP after being registered with the PSS. The PSS may then transmit the REST API change report to the subscriber. The subscriber is configured to not invoke the registered REST API at the RSP based on the REST API change report.

20 Claims, 5 Drawing Sheets

Complete
Request Tree
410

Customization
Request Tree
420

PUBLISHING REST API CHANGES BASED ON SUBSCRIBER'S CUSTOMIZED REQUEST

CROSS-REFERENCE TO RELATED APPLICATION

The present application (U.S. patent application Ser. No. 16/283,835) claims the benefit under 35 U.S.C. § 119(a) of Patent Cooperation Treaty (PCT) Application No. PCT/CN2019/071324, filed Jan. 11, 2019, which is incorporated herein by reference.

BACKGROUND

In a cloud computing environment, applications and systems are becoming more and more complex, as many of the functions in these applications and systems are delivered by cloud-based services such as database-as-a-service, search-as-a-service, etc. In recent years, Representational State Transfer (REST) Application Programming Interfaces (APIs) have become standard building blocks that allow ease of development of cloud-based applications. Many popular web service providers such as Google®, Facebook®, Amazon®, and Microsoft® also start to expose the REST APIs associated with their web sites to application developers, so the developers can gain programmatic access to their web services and functionalities.

Since REST APIs are provided by third-party vendors, they may be subject to constantly changing during continuous development and maintenance cycles. The constantly changing nature of the REST APIs may cause unanticipated web application failing, when such a web application relied on previous and outdated knowledge of the REST APIs. For example, during automated software testing, a previously successful attempt to perform a REST API call to an upstream web service may suddenly cease to work if the REST API is changed without notice. It is difficult for a developer or user to perceive such a change without prior knowledge, and it is hard to quickly respond to such REST API changes, especially in an environment in which quick response within a short release cycle is crucial.

DETAILED DESCRIPTION

Figure 1:
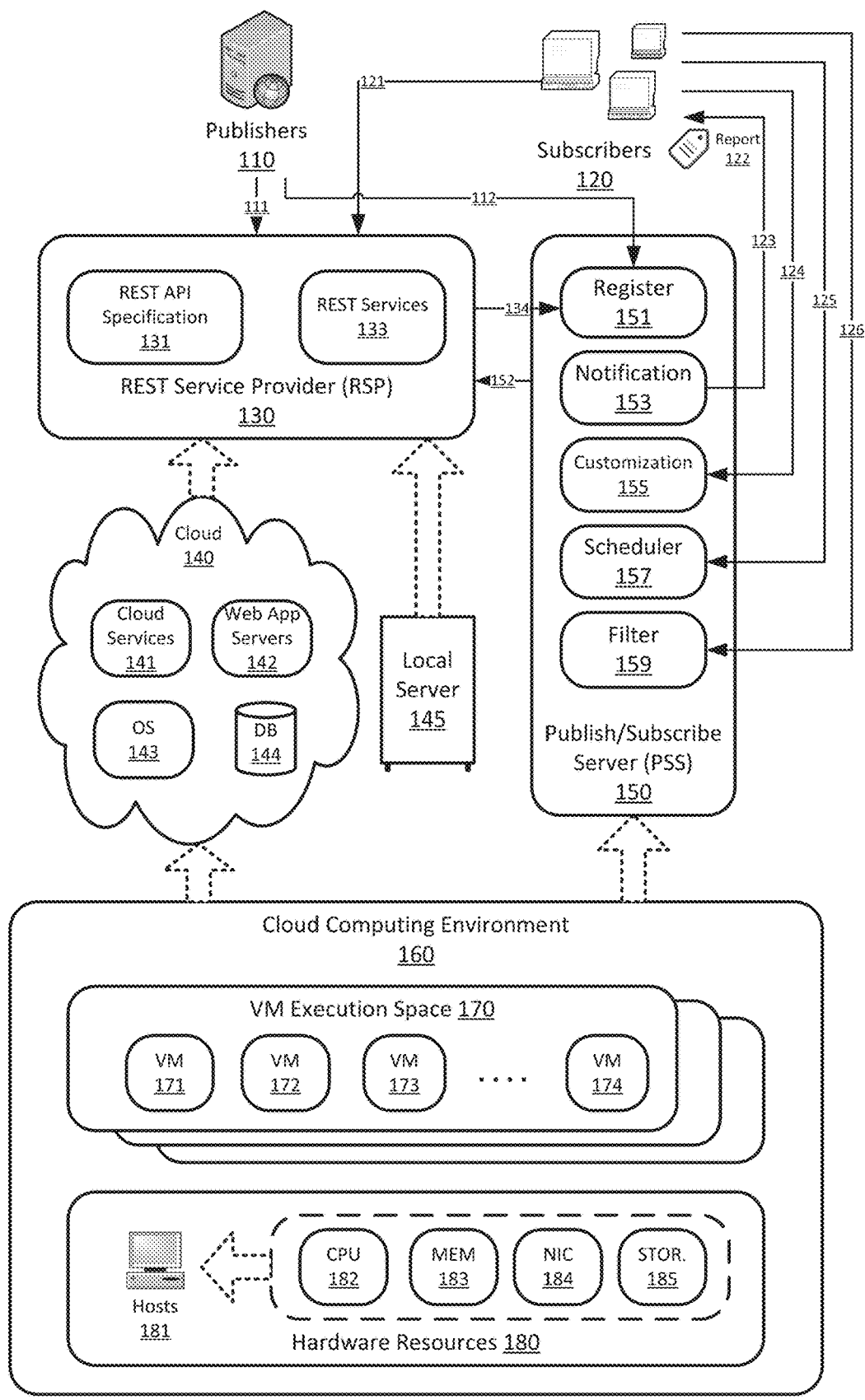
FIG. 1 illustrates a block diagram of a system configured to provide a subscription-based REST API change-notification in a cloud environment, according to one or more embodiments of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

In order to enable a developer or user to quickly respond to unanticipated REST API changes, the present disclosure proposes a publish/subscribe architecture that facilitates automatic detection and publishing of any REST API changes based on a subscriber's customized request. Specifically, this architecture may allow subscribers to customize their requests in different granularities and tailored to the REST API changes they are interested in. The present disclosure also dynamically generates HTML change report in accordance with subscriber's customized requests. Thus, the present disclosure may speed up the developer or user's response to REST API changes, and may also benefit those developers or users who are involved in the manual or automated REST API testing. Further, the present disclosure may be used to obtain usage information related to REST API invocations, which may provide valuable insights in determining the impact of REST APIs, identifying key customers, and estimating the risk of REST API upgrade.

FIG. 1 illustrates a block diagram of a system configured to provide a subscription-based REST API change-notification in a cloud environment, according to one or more embodiments of the present disclosure. In FIG. 1, the system may include a REST service provider ("RSP") 130 and a publish/subscribe server (PSS) 150, one or more publishers 110, and one or more subscribers 120. The RSP 130 and/or the PSS 150 may be implemented based on a cloud environment having one or more clouds (e.g., cloud 140). Further, each of the clouds in the cloud environment may be supported by a corresponding cloud computing environment 160.

In some embodiments, the term "Representational State Transfer" ("REST") may refer to a software architecture that allows flexible creating and accessing of scalable web services. In a REST architecture, functionalities of a network-based application may be divided into "client" and "server" partitions, and communications between the client and server partitions may be achieved through one or more REST "Application Programming Interfaces" ("APIs") invocations over a network (e.g., WIFI network, Internet, etc.). Specifically, each of the REST APIs may be a programming interface associated with a corresponding functionality provided by the server partitions (e.g., web services). A single REST API may be defined by a corresponding "REST API specification", describing the details of, and the mechanisms to invoke, this REST API. By conforming to the REST API specifications, a web developer may independently develop a network-based web application, which can request and access any web services that support REST architecture. For simplicity purposes, web services that support or conform to REST architecture may be referred to as "REST services" (or RESTful services).

In some embodiments, the RSP 130 may be any server that is capable of providing REST services to one or more clients (e.g., the publishers 110 and the subscribers 120). The publishers 110 may be clients that are capable of creating, configuring, and publishing (111) the REST services and REST APIs at the RSP 130. In comparison, the subscribers 120 may be clients configured to remotely invoke the REST APIs and access the REST services provided by the RSP 130. Further, the subscribers 120 may also subscribe to the change-notification services available at the PSS 150. Each of the publishers 110 and subscribers 120 may be implemented using a corresponding computer (such as a server, a desktop, a laptop, a tablet, a handheld device, or the like). Alternatively, the RSP 130 itself may also be deemed a publisher 110 from the perspective of the PSS 150.

In some embodiments, the RSP 130 may include multiple hardware/software modules/components to support the REST services available to the clients. Specifically, the RSP 130 may include a REST API specification module 131 and a REST services module 133. The REST API specification module 131 may be configured to manage the specifications of the REST APIs supported by the RSP 130. The REST services module 133 may be configured to provide the REST services which are accessible via the supported REST APIs. In other words, a client or a remote server may communicate with the REST API specification module 131 to obtain the current and up-to-date REST API specifications. And the client may subsequently invoke the web services provided by the REST Services module 133 using REST API invocations that conform to the REST API specifications received from the REST API specification module 131.

For example, web developers and web administrators may utilize a publisher 110 to load, configure, and publish one or more REST APIs at the RSP 130. The publisher 110 may upload a specific set of REST API specifications to the REST API specification module 131. A subscriber 120 who wishes to explore a particular REST API may communicate 121 with the REST API Specification module 131, requesting the specification of the particular REST API. In response to the request, the REST API Specification module 131 may retrieve and return the current specification of the particular REST API to the subscriber 120. Subsequently, the subscriber 120 may invoke 121 the REST service associated with the retrieved REST API based on the particular REST API's specification.

In some embodiments, the clients may view the RSP 130 as a black box, and may presume that all REST API calls to the RSP 130 are stateless (meaning nothing may be retained by the RSP 130 for the clients between separate REST API calls). By using a stateless protocol and standard operations, the RSP 130 may dynamically add, remove, or update its REST services and/or the REST APIs, even when it is in a run-time or production environment. Although REST APIs may enable the clients to easily and quickly explore, connect, and interact with web services provided by the RSP 130, it may nevertheless affect those clients that rely on the availability and stability of these REST APIs. Therefore, the RSP 130 may require a dynamic approach to quickly and effectively detect and publish REST API changes to the clients.

In some embodiments, a subscriber 120 may be interested in the status of certain REST APIs, especially those APIs that the subscriber 120 is currently utilizing or has previously invoked. For example, the subscriber 120 may want to be notified when any of its interested REST APIs are still available for access, are updated, or are removed. A REST API may be deemed "changed" when there is at least one significant adjustment (including addition, removal, or update) to its associated data structure or invocation mechanism, and such adjustment may affect the subscriber 120 in its utilization of the associated web services. In other words, a REST API change may include any situations in which an invoking client is required to make adjustment to the data transmitted to or received from the REST services, and/or to modify its codes and invocation mechanism. Further, a REST API may also be considered "changed" when the functionalities and the behaviors of its associated REST service are no longer the same. When any of its interested REST APIs is changed, the subscribers 120 may need to either stop/skip the invocation of these REST APIs, or quickly adjust its own programming logics to adapt to these changes.

In some embodiments, the subscribers 120 may utilized a publish/subscribe server (PSS) 150 for providing notifications of REST API changes in the RSP 130. The PSS 150 may be a network-based server that provides automatic change-detection and change-notification to each individual subscriber 120, according to each individual subscriber's customized request. In other words, the subscriber 120 may subscribe to the PSS 150's change-detection services by submitting its customized request for certain REST API changes to the PSS 150. Afterward, once the PSS 150 detects any relevant REST API changes, it may automatically publish/notify such changes to the subscriber 120 according to the subscriber's customized request.

In some embodiments, the PSS 150 may include multiple hardware/software modules/components such as, without limitation, a register module 151, a notification module 153, a customization module 155, a scheduler module 157, and a filter module 159. Through the register module 151, the publisher 110 and/or the RSP 130 may perform publish/registration operations 112 and/or 134 respectively, to register with the PSS 150 a set of REST APIs supported by the RSP 130. Afterward, a subscriber 120 who is interested in the monitoring and the notification of certain REST API changes in the RSP 130 may interact with the customization module 155 to perform a customization operation 125, specifying the type of REST APIs the subscriber 120 is interested in change-notification and change-tracking. In some cases, the subscriber 120 may first invoke 126 the filter module 159 to filter through the set of REST APIs supported by the RSP 130, and extract out the relevant REST APIs' specifications. For example, the subscriber 120 may utilize 126 the filter module 159 to search and filter interested REST APIs using keyword queries.

In some embodiments, the PSS 150 may continuously monitor 152 the REST APIs configured in the RSP 130 for changes and update events such as REST API subscriptions, un-subscriptions, publications, un-publications, additions, and modifications. Once a change is detected, the PSS 150 may evaluate the customized requests previously provided by the subscribers 120. For each of these subscribers 120, the PSS 150 may generate a corresponding change report 122 based on the detected changes and the subscriber's request. Afterward, the notification module 153 may distribute 123 the change report 122 to the specific subscriber 120, informing that the REST APIs it is interested in may have been changed. Alternatively, if there is a new member or newer version of REST API, the notification module 153 may generate/distribute a change report 122 reminding the subscriber 120 the addition, and promoting the subscriber 120 to sync their subscriptions for the new version.

In some embodiments, the subscriber 120 may invoke 125 the scheduler module 157 to configure a customized schedule for the automatic detecting of REST API changes and the delivery of the change report 122 to itself. The PSS 150 may maintain multiple schedules, each of which is associated with a specific subscriber 120. The PSS 150 may respectively activate its analysis engine to selectively detect the REST API changes for those subscribers 120 that have their schedules configured as such.

In some embodiments, the PSS 150 may be implemented as an individual server separated from the RSP 130. In this case, the subscriber 120 may need to invoke the REST services provided by the RSP 130 and access the REST API change notification procedures provided by the PSS 150 via separate network communications. Alternatively, the PSS 150 and the RSP 130 may be integrated into a single network server, thereby allowing the subscriber 120 to interact with this single point-of-access server. For example, when the subscriber 120 invoking a REST service via a single REST API, the RSP 130 may access the modules of PSS 150 (which may be integrated into the RSP 130) to perform a REST API change-monitoring. If any change to the single REST API is detected, in lieu of invoking the changed REST API which may result an error message, the RSP 130 may generate and transmit a report 122 to the subscriber 120, informing that the REST API is changed or no longer available. The subscriber 120 may process the report 122 to determine how to proceed accordingly.

In some embodiments, the RSP 130 may be implemented via a cloud 140 or a local server 145. The local server 145 may be a conventional server computer containing the REST API specification module 131 and the REST services module 133. Further, the PSS 150 (and the various modules contained therein) may be implemented using hardware modules or a software system. For example, the customization module 155 may be implemented using a programmable logic device (e.g., Field-programmable gate array, or "FPGA"), which may be an electronic module or digital circuit that can be field-configurable after manufacturing. In other embodiments, the register module 151 may be a network-enabled hardware module that allows external network communications.

In some embodiments, the RSP 130 and/or the PSS 150 may be implemented by one or more clouds 140. A "cloud" 140 may be a network-based computing architecture that provides shared pools of cloud resources on demand. The cloud 140 may also be a virtual machine cloud ("VM cloud") implemented based on a cloud computing environment 160, which may contain, among other components, one or more virtual machines (VMs) 171-174 and/or physical machines ("hosts") 181. Thus, the cloud 140 may be constructed using multiple hosts 181, and/or multiple VMs 141 that are created based on some of the hosts 181.

In some embodiments, the cloud 140 may include a cloud manager/director (not shown in FIG. 1) configured for implementing the various cloud functionalities such as resource pooling, resource allocating, high-availability, and automation, etc. In some embodiments, the cloud 140 may be constructed using products such as VMWARE® vCloud, and the cloud manager may be implemented using a VMWARE vRealize Suite. The cloud 140 may also be configured with a VMWARE VSPHERE server. Alternatively, the cloud 140 may be constructed using any commercial cloud products, such as OpenStack® Cloud, and/or AMAZON® S3 Cloud.

In some embodiments, the cloud computing environment 160 may include one or more virtual machine execution space 170. Each VM execution space 170 may contain multiple VMs 171, 172, 173, and 174 configured to host various applications. Further, the cloud computing environment 160 may include a VM manager or hypervisor (such as VMware ESX® based hypervisor, or Microsoft® Hyper-V® virtualization, all of which are not shown in FIG. 1) to create the VMs 171-174 based on the hardware resources 180. The hardware resources 180 may include one or more hosts 181, each of which may be a physical computer system having a "physical hardware platform" (e.g., an x86 architecture platform). The hypervisor may be configured to construct a "virtual hardware platform" for the VMs 171-174 based on the host 181's physical hardware platform.

In some embodiments, to support the physical hardware platform, the hardware resources 180 may include various "physical hardware components" such as, without limitation, one or more physical Central Processing Units (CPUs) 182, physical memory 183, physical Network Interface Card (NIC) 184, physical storage (e.g., hard drive) 185, and/or additional electronic circuit components (all of which may be supplied by one or more hosts 181). Each of CPU(s) 182 may be configured to execute instructions that perform one or more operations described herein. The instructions can be stored in the memory 183, storage 185, or any other memory in the hosts 181 (e.g., cache memory) that, when executed by the CPU 182, cause the CPU 182 to perform certain operations as described herein. The memory 183 may be non-transitory storage medium configured to store various information, and may include, e.g., random access memory (RAM), read-only memory (ROM), or a combination thereof. The NIC 184 may include one or more network adapters. And the storage 185 may include local storage devices, such as hard disks, flash memory modules, solid state disks, optical disks, and the like. Storage 185 can also include interface(s) configured for communication with one or more network data storage systems, such as host bus adapter(s) configured for communication with a storage array network (SAN) or network-attached storage (NAS), as well as other network data storage systems.

In some embodiments, based on the hardware resources 180, the VM manager may configure a "virtual hardware platform" for the VMs 171-174 with one or more "virtual hardware components" such as, without limitation, one or more virtual CPUs, virtual memory, virtual storage, virtual NIC, and/or additional virtual components (not shown in FIG. 1). With helps from the VM manager, the virtual hardware components may emulate the behaviors and the computing capabilities of the corresponding physical hardware components, thereby allowing the VMs 171-174 to function as if they were physical hosts 181.

In some embodiments, the cloud 140 may also include a cloud director (not shown in FIG. 1) that manages the cloud computing environment 160. The cloud director may be implemented using a VM or a physical computing system. The cloud 140 may further include multiple hardware/software components such as cloud services 141, web app servers 142, operating system (OS) 143, and database (DB) 144. The cloud services 141 may include various types of network applications executable within the OS 143. In an example, the cloud services 141 may include REST services accessible via the REST APIs. A subscriber 120 may transmit to the RSP 130 (which is implemented by the cloud 140) an HTTP request to invoke a REST API. The cloud services 141 may process the HTTP request, and perform the corresponding REST services which may be When the REST services API operation is complete, cloud director 152 can send a result of the API operation to cloud manager 132 in a final part of the HTTP response.

Figure 2:
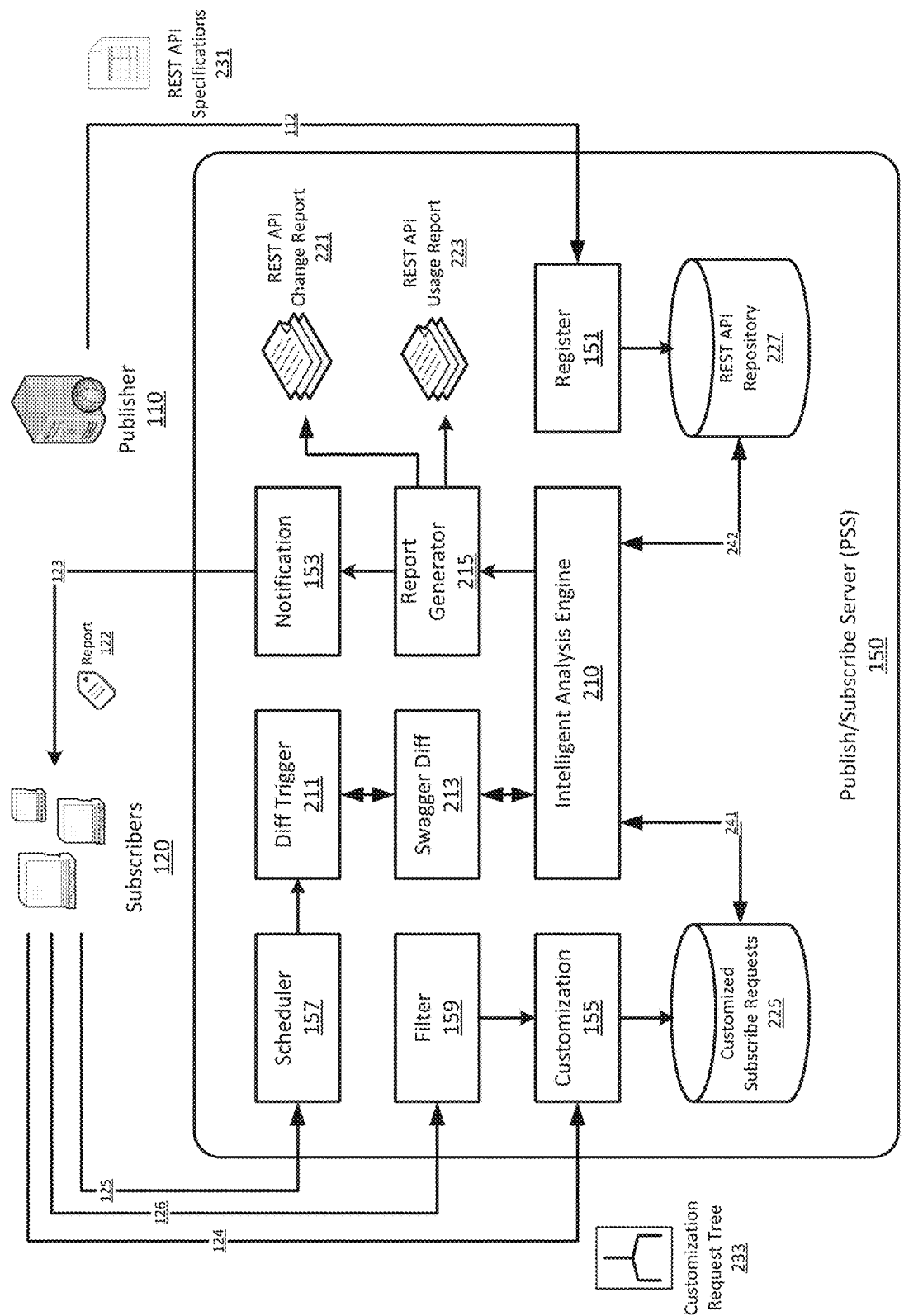
FIG. 2 illustrates additional details of a publish/subscribe server for publishing REST API changes based on subscriber's customized request, according to one or more embodiments of the present disclosure.

FIG. 2 illustrates additional details of a publish/subscribe server for publishing REST API changes based on subscriber's customized request, in accordance to one or more embodiments of the present disclosure. In FIG. 2, various modules/components may correspond to their respective counterparts in FIG. 1. Similar to the PSS 150 in FIG. 1, the PSS 150 of FIG. 2 may contain a register module 151, a notification module 153, a customization module 155, a scheduler module 157, and a filter module 159. The PSS 150 of FIG. 2 may further contain an intelligent analysis engine 210, a diff trigger module 211, a swagger diff module 213, and a report generator 215. The PSS 150 may also utilize a customized subscribe requests repository 225, and a REST API repository 227 for storage purposes, and may generate REST API change report 221 and REST API usage report 223 for various clients.

In some embodiments, a publisher 110 may publish 112 a set of REST APIs supported by a REST service provider ("RSP", similar to RSP 130 of FIG. 1) through the register module 151 of the PSS 150. Alternatively, the RSP may also directly publish and register its supported REST APIs via the register module 151. During the REST API registration process, the publisher 110 or the RSP may transmit 112 to the register module 151 the specifications of the to-be-registered REST APIs ("REST API specifications 231"). In some embodiments, the REST API specifications 231 may be in JSON/YAML format. Additional information associated with the REST APIs, including e.g. products, components, versions, tags for feature may also be published 112 to the PSS 150 via the register module 151, especially when these info cannot be extracted directly from the REST API specifications 231.

In some embodiments, when a publisher 110 transmits 112 a set of REST API specifications 231 to the register module 151, the register module 151 may store the received REST API specifications 231 into the REST API repository 227. The REST API repository 227 may be a data storage module (e.g., a database) configured for storing and retrieving REST API specifications and their associated additional information. Following the above REST API registration process, the REST API specifications stored in the REST API repository 227 may be referred to as the "registered REST API specifications", and the REST APIs associated with the registered REST API specifications may also be referred to as the "registered REST APIs."

In some embodiments, a subscriber 120 who is interested in being notified of certain REST API changes may configure a customized request to specify which REST APIs and what types of changes it is interested in. Subsequently, the subscriber 120 may transmit 124 to the customization module 155 the configured customized request, indicating its intent to subscribe to the REST API change-notification provided by the PSS 150. The customization module 155 may then process the received customized request and store the received customized request in the customized subscribe requests repository 225. The customized subscribe requests repository 225 may be a data storage module (e.g., a database) configured for storing and retrieving the customized requests received from multiple subscribers 120.

In some embodiments, the subscriber 120 may utilize the customized request to specify which REST APIs and the different granularities of changes in REST APIs should the PSS 150 monitor for. The customized request may contain a customization request tree 233, which may be a flexible data structure for specifying the subscriber 120 change-notification requirements, including e.g., which REST APIs or which element(s) of the REST APIs, as well as what kind of change events (e.g., addition, update, removal, functionality change), the subscriber 120 is interested in. In other words, each customization request tree 233 may be tailored to a specific subscriber 120's change-notification need.

Figure 3:
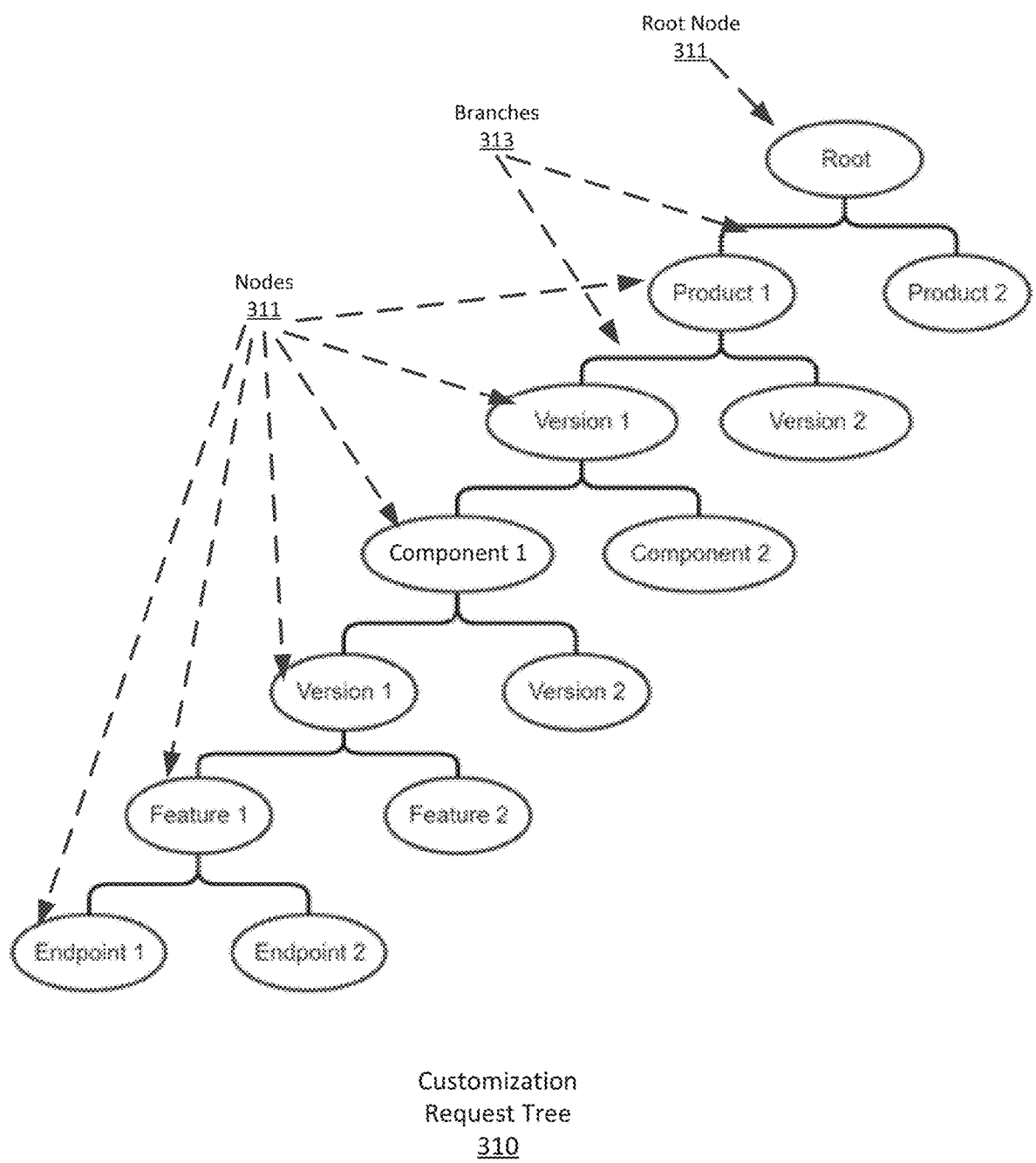
FIG. 3 shows a customization request tree for describing a subscriber's customized request and requirements in REST API change-monitoring, according to one or more embodiments of the present disclosure.

FIG. 3 illustrates a customization request tree for describing a subscriber's customized request and requirements in REST API change-monitoring, according to one or more embodiments of the present disclosure. In FIG. 3, a customization request tree 310 may be a hierarchical tree-like data structure having a root node 311 and multiple branches 313. Each branch 313 may include one or more child nodes 311 and one or more additional branches (e.g., "sub-branches"). In FIG. 3's example, the customization request tree 310 may include various child nodes 311 representing different elements of the REST APIs, such as product, component, version, feature, and endpoint etc.

In some embodiments, a subscriber may utilize a customization request tree 310 to describe in different granularities the REST APIs it intends to track for changes. Specifically, the subscriber may provide a set of monitoring-elements, each of which is either a keyword for identifying a certain aspect of the REST APIs or a criteria for searching through the REST APIs for matching APIs. For example, the subscriber may use the nodes to provide certain monitoring-elements such as "product", "component", and "version", in order to narrow-down or pin-point the specific REST APIs. The PSS may filter through all the registered REST APIs to search for those REST APIs that match the provided monitoring-elements.

In some embodiments, each REST API may be defined using various specifications and parameters. For example, a REST API may include a uniform resource identifier (URI) for addressing its associated resource location on the network. The REST API may also contain additional definable elements such as objects, fields, components, versions, paths, tags, types, properties, parameters, features, etc. The subscriber may configure a set of monitoring-elements to specify how to use these definable elements as request conditions and searching criteria. In some embodiments, a monitoring-element may contain a name-value pair for specifying the identifiable "name" of the element, and the "value" of the element as search criteria. For example, a monitoring-element may be "version=6.0", indicating the name of the element is "version", and the value of the element should be "6.0". When used in a customization request tree 310, this monitoring element may indicate the subscriber's intention to identify a REST API having a version number of "6.0".

In some embodiments, the hieratical relationships among the definable elements in a REST API may be modeled by the hieratical structures of the customization request tree 310. In other words, the monitoring-elements may be represented by the nodes in the customization request tree 310, and the relationships among the monitoring-elements may be constructed using the multiple layers of branches and sub-branches in the customization request tree 310.

In some embodiments, a subscriber may further clarify in the customization request tree 310 the types of changes it may subscribe to. For example, the subscriber may specify that it requires notification when certain monitoring-elements in a REST API are "created", "updated", and/or "deleted". Alternatively, the subscriber may be interested when a specific parameter of the REST API is changed from "optional" to "mandatory", when a data type is changed from "text" to "integer", when the data type for the response body is changed from "string" to "array", or when the request parameter type is changed from "path" to "query."

In some embodiments, a subscriber may generate a specific customization request tree based on a "complete request tree". The "complete request tree" may be a request tree that includes all available monitoring-elements and branches in a REST API. The subscriber may construct its customization request tree 310 by browsing the nodes and the layers of the complete request tree, and select those nodes and branches that correspond to its customized request. Afterward, the subscriber may generate the customization request tree 310 based on the selected nodes and branches from the complete request tree.

Figure 4:
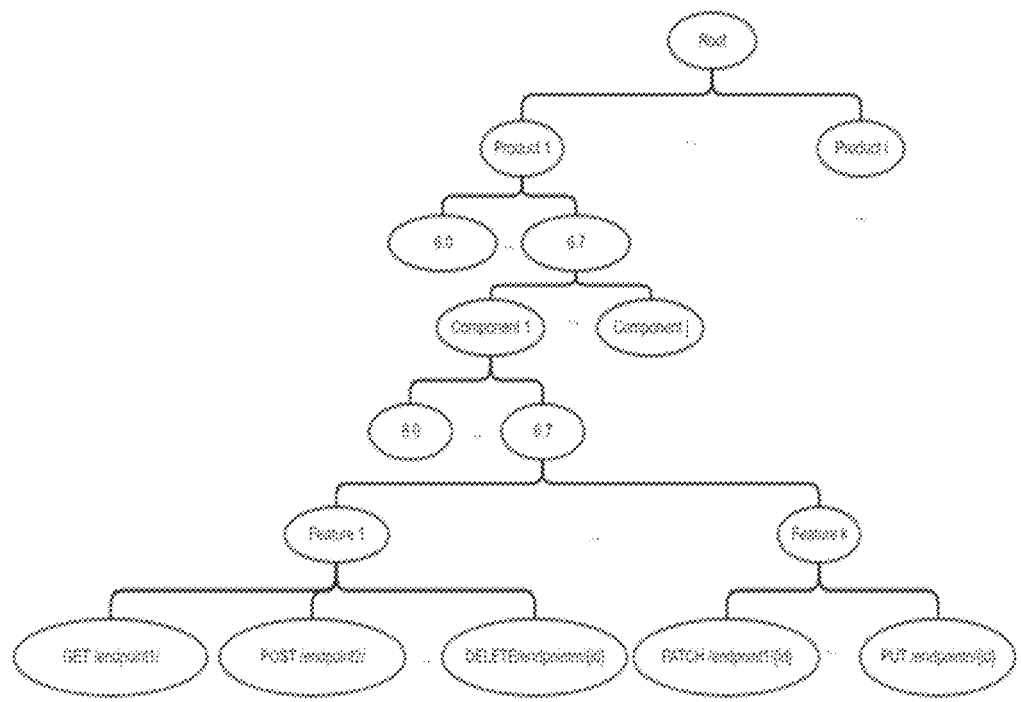
FIG. 4 shows an exemplary complete request tree and an exemplary customization request tree for describing a subscriber's customized request in monitoring REST API changes, according to one or more embodiments of the present disclosure.
Figure 4:
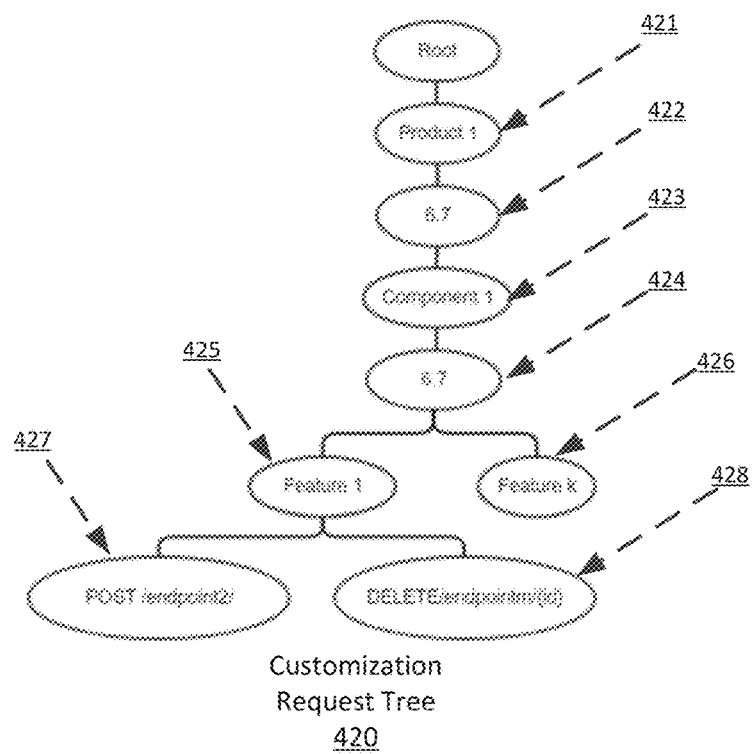

FIG. 4 illustrates an exemplary complete request tree and an exemplary customization request tree for describing a subscriber's customized request in monitoring REST API changes, according to one or more embodiments of the present disclosure. In FIG. 4, a complete request tree 410 may be used to provide all the available options for request customization. Each complete request tree 410 is associated with a specific REST API, and a subscriber may be able to browse the complete request tree 410 to quickly grasp all the monitoring-elements that are associated with the specific REST API, as well as the structural relationships among these monitoring-elements in the Specific REST API.

For example, the complete request tree 410 may show that for monitoring-element "product", the available selections include "Product 1" to "Product i". Also, the complete request tree 410 may reveal the hierarchical structures among the different layers of monitoring-elements. For example, each node representing monitoring-element "Product Version" may have multiple child nodes representing monitoring-elements "Component". This may indicate that under each REST API product version, there might be multiple components. For simplicity purposes, only a portion of the complete request tree 410 is shown in FIG. 4.

In some embodiments, a subscriber may generate a customization request tree 420 based on the complete request tree 410. Specifically, the subscriber may construct, based on all the available "product" monitoring-elements in the complete request tree 410, a particular product (e.g., "Product 1" as shown by node 421) as a monitoring element. Likewise, the subscriber may select a particular product version monitoring-element (e.g., "6.7" as shown by node 422), a particular component of the product version monitoring-element (e.g., "Component 1" as shown by node 423), and a particular component version monitoring-element (e.g., "6.7" as shown by node 424), and construct the customization request tree 420 accordingly.

In some embodiments, the subscriber may be interested in several features of the particular component version, including e.g., "Feature 1" as shown by node 425 and "Feature k" as shown by node 426. With respect to "Feature 1" shown by node 425, the subscriber may be interested in two methods (endpoints) of the REST API (e.g., a "POST/endpoint2/" and a "DELETE/endpointm/{id}" as shown by nodes 427 and 428). As shown by node 426, the subscriber may be interested in all methods associated with "Feature k". Also, the hieratical relationships among these monitoring-elements in the customization request tree 420 may be established based on the branches and layers as structured in the complete request tree 410.

Referring back to FIG. 2. In some embodiments, a subscriber 120 may transmit 124 a customized request to the customization module 155, and the customization module 155 may extract the customization request tree 233 from the customized request, and store the customization request tree 233 to the customized subscribe requests repository 225 for subsequent processing. Alternatively, the subscriber 120 may transmit 126 the customized request to the filter module 159, which contain a set of monitoring-elements. The filter module 159 may extract the set of monitoring-elements from the customized request, and construct based on the extracted monitoring-elements a query for searching and filtering interested REST APIs. The filter module 159 may transmit the customized request and the query to the customization module 155, for it to store the customized request and the query to the customized subscribe requests repository 225 for subsequent processing.

In some embodiments, along with transmitting the customized request to the customization module 155 or the filter module 159, the subscriber 120 may further transmit 125 a schedule to the scheduler module 157. The schedule may define a specific time scheme (e.g., in time, date, frequency, etc.) the subscriber 120 intends the PSS 150 to monitor/detect REST API changes, and to notify the detected changes. The schedule may also include information related to the mechanism of delivering the notification. Based on the different schedules provided by the subscribers 120, the scheduler module 157 may invoke the corresponding modules in the PSS 150 to initiate the different change-monitoring and change-notification activities for each of the subscribers 120.

In some embodiments, based on the schedules defined through the scheduler module 157, the intelligent analysis engine 210 may either be invoked by the scheduler module 157, or be self-invoked, to perform real-time automatic detection and publishing of the REST API changes. Further, the intelligent analysis engine 210 may be responsible for real-time messaging service, for publishing and subscribing to events, and for exchanging messages among those different modules in the PSS 150, all based on the predefined schedules.

In some embodiments, based on the schedules, the intelligent analysis engine 210 may retrieve 241 the stored customization request trees 233 from the customized subscribe requests repository 225, retrieve 242 the registered REST API specifications that are previously stored in the REST API repository 227, and perform change-detections based on the retrieved customization request tree 233 and the retrieved registered REST API specifications. For a specific customization request tree 233 retrieved from the customized subscribe requests repository 225, the intelligent analysis engine 210 may identify a set of REST API specifications in the REST API repository 227 that satisfy the conditions and criteria as specified in the specific customization request tree 233. In other words, the intelligent analysis engine 210 may search through the REST API repository 227 and identify the matching REST API specifications by evaluating the monitoring-elements in the specific customization request tree 233 with the corresponding parameters and values in the REST API specifications. The matched REST API specifications may be deemed "registered REST API specifications" for subsequent change-detection and change-notification.

In some embodiments, for a specific identified registered REST API specification, the intelligent analysis engine 210 may retrieve from the REST service provider the specification of the associated REST API that is currently in use ("current REST API registration"). Since after the publisher 110 published the REST APIs, subsequent changes may happen to these REST APIs. Thus, the registered REST API specification and the current REST API specification may become different; a situation which may break any subscriber who intends to access the REST service provider based on the specification of the REST API during prior registration.

In some embodiments, the intelligent analysis engine 210 may perform a change-detection based on the registered REST API specification and the current REST API specification. Specifically, the intelligent analysis engine 210 may invoke the diff trigger module 211 and/or the swagger diff module 213 to detect any changes between the registered REST API specification and the current REST API specification. Alternatively, the scheduler module 157 may also invoke the diff trigger module 211 based on the schedules it manages, in order to trigger the intelligent analysis engine 210 as well as the swagger diff module 213 to perform change-detection.

In some embodiments, the swagger diff module 213 may be configured to detect changes between the registered REST API specification and the corresponding current REST API specification. Specifically, the swagger diff module 213 may compare the two REST API specifications to determine whether certain elements (e.g., paths, verbs, parameters, and the combinations thereof) in the registered REST API specification may be present, missing, or changed in the current REST API specification. The swagger diff module 213 may identify whether certain parameters which are optional in the registered REST API specification may be required in the current REST API specification. Further, the swagger diff module 213 may check the data types and attributes between the registered REST API specification and the current REST API specification for consistency and differences. The swagger diff module 213 may then generate a "difference output" enumerating all changes and discrepancies between the two REST API specifications, including the added, removed, or modified endpoint/request parameters/response attributes etc.

In some embodiments, after received from the swagger diff module 213 a difference output for a specific REST API, the intelligent analysis engine 210 may invoke the report generator 215 to dynamically generate a REST API change report 221 The REST API change report 221 may be in HTML format, and may be corresponding to the specific REST API, which is associated with a specific customization request tree 233 extracted from a specific customized request of a specific subscriber 120. The report generator 215 may generate the REST AP change report 221 based on the schedules previously submitted by the subscriber 120 to the scheduler module 157.

In some embodiments, the report generator 215 may transmit the generated REST API change report 221 to the notification module 153. And the notification module 153 may transmit such REST API change report 221 as the report 122 to the corresponding subscriber 120. Specifically, the notification module 153 may transmit 123 the report 122 via email, Slack, online viewer, or other user-interactive mechanisms, all accordingly to the schedules previously established by the subscriber 120.

In some embodiments, the report generator 215 may further generate a REST API usage report 223 for a REST service provider. Specifically, a publisher 110 may be interested in a REST API usage report 223 for REST APIs it has previously published to the REST service provider. In this case, the intelligent analysis engine 210 may generate a specific REST API usage report 223 for such a publisher 110 based on publisher's registration information provided during all previous REST API registration processes. The generated REST API usage report 223 may include usage volume for REST APIs, top-k subscribed product/component/feature/endpoint, active subscriber, new vs. returning subscriber etc.

Thus, the above approaches may benefit those subscribers or users who are interested in REST APIs from a specific product or tool providers. These approaches can not only be used for a subscriber who invokes or integrates the REST APIs developed by others, especially in continuous development and integration environment, they can also be used for both manual and automation REST API testing. Further, the above approach enables a user to obtain user-specific usage reports for REST API, which may provide insights into determining the impact of REST APIs, identifying loyal customers, and estimating the risk for REST API upgrading.

Figure 5:
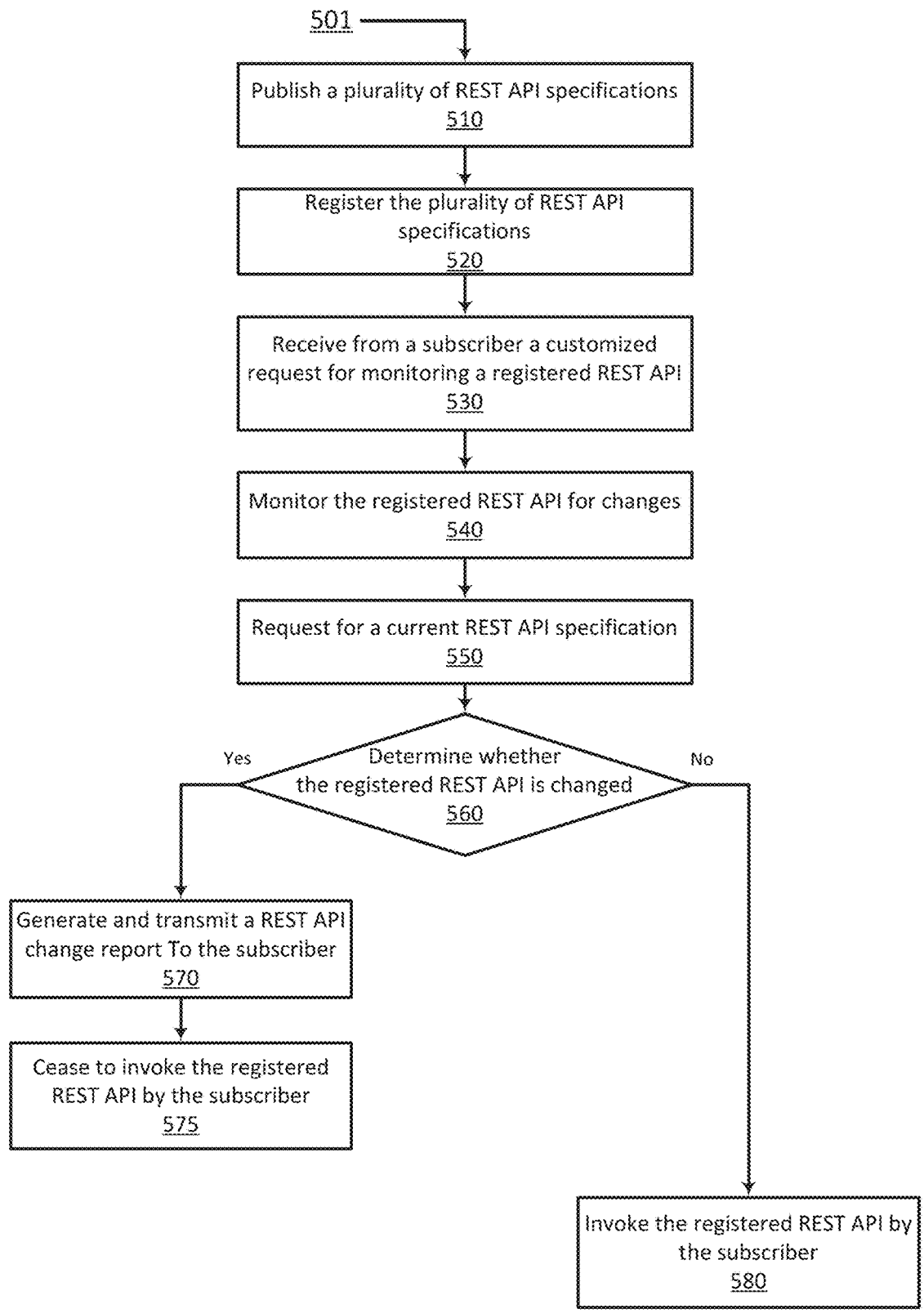
FIG. 5 shows a flow diagram illustrating a process for publishing REST API changes based on subscriber's customized request in a cloud environment, according to one or more embodiments of the present disclosure.

FIG. 5 shows a flow diagram illustrating a process for publishing REST API changes based on subscriber's customized request in a cloud environment, according to one or more embodiments of the present disclosure. The processes 501 may set forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 5 may be practiced in various implementations.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

At block 510, a REST service provider (RSP) in a cloud environment may be configured to support a plurality of REST APIs. A publisher may publish, and a publish/subscribe server (PSS) may receive from the publisher, the specifications of the plurality of REST APIs (i.e., the plurality of REST API specifications) supported by the RSP. The publisher may be interacting with the RSP via network communications in the cloud environment. Likewise, the PSS and the RSP may be implemented based on two clouds communicating with each other, or be implemented using a single cloud.

At block 520, the PSS may register the plurality of REST APIs by processing and storing the received plurality of REST API specifications in a REST API repository managed by the PSS.

At block 530, the PSS may receive, from a subscriber operating in the cloud environment, a customized request for monitoring a registered REST API supported by the RSP and already registered with the PSS. In some embodiments, the subscriber may be configured to invoke the registered REST API at the RSP. The PSS may process the customized request to identify the registered REST API, and then retrieve from the REST API repository one of the plurality of REST API specifications that is associated with the registered REST API. The retrieved REST API specification may be referred to as the registered REST API specification. Further, the customized request may include a customization request tree indicating one or more monitoring-elements in the registered REST API specification for change-monitoring.

At block 540, the PSS may monitor the registered API for any changes at the RSP based on a schedule specified by the customized request. Based on the schedule, the PSS may invoke its intelligent analysis engine to perform change-detection and change-notification.

At block 550, the PSS may request for (and receive from the RSP) a current REST API specification associated with the registered REST API.

At block 560, the PSS may determine whether the registered REST API is changed by comparing the current REST API specification and the registered REST API specification for changes at the one or more monitoring-elements. If the PSS determines that the registered REST API is changed, the process may process to block 570. If the PSS determines that the registered REST API is NOT changed, the process may process to block 580.

At block 570, in response to the determination that the registered REST API is changed at the RSP based on the customized request, the PSS may generate a REST API change report indicating a change event occurred to the registered REST API at the RSP after being registered with the PSS. Afterward, the PSS may transmit the REST API change report to the subscriber who submitted the customized report.

In some embodiments, the PSS may generate and transmit the REST API change report based on the schedule submitted by the subscriber via the customized report.

At block 575, based on the REST API change report, the PSS may recommend the subscriber to stop using/invoking the registered REST API, since it may be deprecated or changed in a newer version. The subscriber may be configured to NOT invoke the registered REST API at the RSP based on the REST API change report and the PSS's recommendation. Alternatively, even when there is a newer version of REST API in the RSP, the old/original version of the REST API may remain unexpired. That means the newer version and the old version may co-exist in the RSP at the same time. In this case, the subscriber may choose to either invoke the newer version or still use the old version of the REST API at the RSP.

At block 580, in response to the determination that the registered REST API is NOT changed at the RSP based on the customized request, the subscriber is configured to invoke the registered REST API at the RSP.

Thus, systems and methods for automatically publishing REST API changes based on subscriber's customized request in a cloud environment have been disclosed. The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations.

In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term non-transitory computer readable storage medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method to automatically publish representational state transfer (REST) application program interface (API) changes in a cloud environment, the method comprising:
    receiving, by a publish/subscribe server (PSS) from a subscriber operating in the cloud environment, a customized request specifying a registered REST API supported by a REST service provider (RSP) and registered with the PSS, wherein the registered REST API is invoke-able at the RSP by the subscriber;
    receiving, by the PSS from the subscriber, a schedule that defines a time scheme to both monitor whether the registered REST API is changed and to provide a notification of the changed registered REST API, wherein the time scheme defined by the schedule specifies at least one of a time, date, or frequency to both monitor whether the registered REST API is changed and provide the notification of the changed registered REST API;
    monitoring, by the PSS, the registered REST API for any changes associated with the registered REST API at the RSP based on the customized request and the schedule;
    in response to a determination that the registered REST API is changed at the RSP, generating, by the PSS, a REST API change report indicating a change event occurred to the registered REST API at the RSP after being registered with the PSS; and
    transmitting, by the PSS based on the schedule, the REST API change report to the subscriber as the notification of the changed registered REST API.

2. The method as recited in claim 1, further comprising:
    receiving, by the PSS from a publisher, a plurality of REST API specifications supported by the RSP; and
    registering, by the PSS, the plurality of REST API specifications, wherein the registered REST API is associated with one of the plurality of REST API specifications.

3. The method as recited in claim 2, wherein the determination that the registered REST API is changed at the RSP comprises:
    receiving, from the RSP, a current REST API specification associated with the registered REST API;
    retrieving, from the registered plurality of REST API specifications, a registered REST API specification associated with the registered REST API; and
    comparing the current REST API specification with the registered REST API specification to determine whether the registered REST API is changed.

4. The method as recited in claim 3, wherein:
    the customized request includes a customization request tree indicating one or more monitoring-elements in the registered REST API specification for change-monitoring, and
    the determination whether the registered REST API is changed is based on comparing the current REST API specification and the registered REST API specification for changes at the one or more monitoring-elements.

5. The method as recited in claim 1, wherein the generating of the REST API change report is also based on the schedule, wherein the schedule is specified by the customized request, wherein the schedule further includes information related to a mechanism for delivery of the REST API change report to the subscriber as the notification of the changed registered REST API, and wherein the PSS maintains multiple different schedules each associated with a specific subscriber.

6. The method as recited in claim 1, wherein the subscriber is configured to not invoke the registered REST API at the RSP based on the REST API change report.

7. A non-transitory computer-readable storage medium, containing a set of instructions which, in response to execution by a processor, cause the processor to perform a method to automatically publish representational state transfer (REST) application programming interface (API) changes in a cloud environment, wherein the method comprises:
    prior to invoking a registered REST API at a REST service provider (RSP):
        transmitting, to a publish/subscribe server (PSS) by a subscriber operating in the cloud environment, a customized request specifying the registered REST API for evaluating whether the registered REST API, which is registered by the PSS, is changed at the RSP; and
        transmitting, to the PSS from the subscriber, a schedule that defines a time scheme to both monitor whether the registered REST API is changed and to provide a notification of the changed registered REST API, wherein the time scheme defined by the schedule specifies at least one of a time, date, or frequency to both monitor whether the registered REST API is changed and provide the notification of the changed registered REST API;
    receiving, by the subscriber and based on the schedule, a REST API change report associated with the registered REST API from the PSS, wherein the REST API change report is generated as the notification by the PSS based on the customized request; and
    in response to the REST API change report indicating that a change event occurred to the registered REST API at the RSP after the registered REST API is registered by the PSS, skipping, by the subscriber, the invoking of the registered REST API at the RSP.

8. The non-transitory computer-readable storage medium of claim 7, wherein the PSS generates the REST API change report by:
    receiving, by the PSS from a publisher, a plurality of REST API specifications supported by the RSP; and
    registering, by the PSS, the plurality of REST API specifications, wherein the registered REST API is associated with one of the plurality of REST API specifications.

9. The non-transitory computer-readable storage medium of claim 8, wherein the PSS further generates the REST API change report by:

receiving, from the RSP, a current REST API specification associated with the registered REST API;

retrieving, from the registered plurality of REST API specifications, a registered REST API specification associated with the registered REST API; and determining whether the registered REST API is changed by comparing the current REST API specification with the registered REST API specification.

10. The non-transitory computer-readable storage medium of claim 9, wherein:

the customized request includes a customization request tree indicating one or more monitoring-elements in the registered REST API specification for change-monitoring, and the determining whether the registered REST API is changed is based on comparing the current REST API specification and the registered REST API specification for changes at the one or more monitoring-elements.

11. The non-transitory computer-readable storage medium of claim 7, wherein the PSS monitors the registered REST API for any changes at the RSP based on the schedule, wherein the schedule is specified by the customized request, wherein the schedule further includes information related to a mechanism for delivery of the REST API change report to the subscriber as the notification of the changed registered REST API, and wherein the PSS maintains multiple different schedules each associated with a specific subscriber.

12. The non-transitory computer-readable storage medium of claim 11, wherein the PSS further generates the REST API change report based on the schedule.

13. The non-transitory computer-readable storage medium of claim 7, wherein:

when the REST API change report indicates that no change event occurred to the registered REST API at the RSP after the registered REST API is registered by the PSS, invoking, by the subscriber, the registered REST API at the RSP.

14. A system for to automatically publish representational state transfer (REST) application programming interface (API) changes in a cloud environment, the system comprising:

a publish/subscribe server (PSS) supported by a first cloud in the cloud environment for registering a REST API;

a REST service provider (RSP) supported by a second cloud in the cloud environment for supporting the registered REST API; and a subscriber operating in the cloud environment and coupled with the RSP and the PSS, wherein prior to invoking the registered REST API at the RSP through the second cloud, the subscriber is configured to:

transmit, to the PSS through the first cloud, a customized request specifying the registered REST API for evaluating whether the registered REST API is changed at the RSP:

transmit, to the PSS, a schedule that defines a time scheme to both monitor whether the registered REST API is changed and to provide a notification of the changed registered REST API, wherein the time scheme defined by the schedule specifies at least one of a time, date, or frequency to both monitor whether the registered REST API is changed and provide the notification of the changed registered REST API;

receive, based on the schedule, a REST API change report associated with the registered REST API from the PSS, wherein the REST API change report is generated as the notification by the PSS based on the customized request; and in response to that the REST API change report indicates that a change event occurred to the registered REST API at the RSP after being registered, skip the invoking of the registered REST API at the RSP.

15. The system of claim 14, further comprising:

a publisher coupled with the PSS, wherein the publisher is configured to transmit to the PSS a plurality of REST API specifications supported by the RSP, and the PSS registers the REST API by associating the registered REST API with one of the plurality of REST API specifications.

16. The system of claim 14, wherein the RSP is configured to transmit to the PSS a plurality of REST API specifications supported by the RSP, and the PSS registers the REST API by associating the registered REST API with one of the plurality of REST API specifications.

17. The system of claim 14, wherein to generate the REST API change report, the PSS is configured to:

receive, from the RSP, a current REST API specification associated with the registered REST API;

retrieve, from the registered plurality of REST API specifications, a registered REST API specification associated with the registered REST API; and determine whether the registered REST API is changed by comparing the current REST API specification with the registered REST API specification.

18. The system of claim 17, wherein:

the customized request includes a customization request tree indicating one or more monitoring-elements in the registered REST API specification for change-monitoring, and the PSS determines whether the registered REST API is changed by comparing the current REST API specification and the registered REST API specification for changes at the one or more monitoring-elements.

19. The system of claim 14, wherein the PSS monitors the registered REST API for any changes associated with the registered REST API at the RSP based on the schedule, wherein the schedule is specified by the customized request, wherein the schedule further includes information related to a mechanism for delivery of the REST API change report to the subscriber as the notification of the changed registered REST API, and wherein the PSS maintains multiple different schedules each associated with a specific subscriber.

20. The system of claim 19, wherein the PSS further generates the REST API change report based on the schedule.

* * * * *